(12) United States Patent
Connell (10) Patent No.: US 8,961,273 B2
(45) Date of Patent: Feb. 24, 2015

(54) POULTRY FRONT HALF PROCESSING APPARATUS AND METHOD

(71) Applicant: Gold'n Plump Poultry, Inc., St. Cloud, MN (US)

(72) Inventor: Douglas Robert Connell, Sartell, MN (US)

(73) Assignee: Gold'n Plump Poultry, LLC, St. Cloud, MI (US)

( * ) Notice: Subject to any disclaimer, the term of this patent is extended or adjusted under 35 U.S.C. 154(b) by 0 days.

(21) Appl. No.: 14/205,744

(22) Filed: Mar. 12, 2014

(65) Prior Publication Data

US 2014/0315476 A1    Oct. 23, 2014

Related U.S. Application Data

(60) Provisional application No. 61/791,039, filed on Mar. 15, 2013.

(51) Int. Cl.
*A22B 5/16* (2006.01)
*A22C 21/00* (2006.01)

(52) U.S. Cl.
CPC ......... *A22C 21/0069* (2013.01); *A22C 21/0092* (2013.01)

USPC .......................................... 452/125

(58) Field of Classification Search
USPC ......... 452/106, 125, 127, 135, 136, 149, 177, 452/179, 180, 185, 188–190, 194
See application file for complete search history.

(56) References Cited

U.S. PATENT DOCUMENTS

| | | | |
|---|---|---|---|
| 4,543,688 A * | 10/1985 | Barchus | 452/187 |
| 4,557,017 A | 12/1985 | Gasbarro | |
| 4,648,155 A | 3/1987 | Burnett | |
| 4,873,746 A | 10/1989 | Scheier et al. | |
| 5,569,072 A * | 10/1996 | Tieleman et al. | 452/185 |
| 5,618,230 A | 4/1997 | Bargele et al. | |
| 5,725,082 A | 3/1998 | Connell | |
| 6,151,866 A | 11/2000 | Connell | |
| 7,341,505 B1 * | 3/2008 | Gasbarro | 452/169 |
| 8,105,138 B2 * | 1/2012 | Van Den Nieuwelaar et al. | 452/177 |
| 8,172,653 B2 | 5/2012 | Landt | |

* cited by examiner

*Primary Examiner* — Richard Price, Jr.
(74) *Attorney, Agent, or Firm* — Aleya R. Champlin; Briggs and Morgan, P.A.

(57) ABSTRACT

A poultry front half processing module is shown and described. The module includes a rotatable wing bracket for securely engaging the wings of the front half to allow more accurate processing and easier deboning and transfer operations.

25 Claims, 12 Drawing Sheets

POULTRY FRONT HALF PROCESSING APPARATUS AND METHOD

CROSS-REFERENCE TO RELATED APPLICATIONS

This application claims the benefit of priority under 35 U.S.C. §119(e) of U.S. Provisional Patent Application No. 61/791,039, filed on Mar. 15, 2013, the contents of which are incorporated by reference in their entirety herein.

BACKGROUND OF THE INVENTION

Commercial poultry processing involves the steps of taking whole poultry, such as chicken, turkey, duck, goose, and the like, and systematically cleaning, separating and deboning the various parts of the poultry for subsequent packaging or cooking.

Improvements to speed, sanitation and safety measures in poultry processing have led to very high processed poultry production rates. However, with high production rates, it is important to be able to provide consistent poultry products efficiently, avoiding excess waste or extended line down time.

Variations in poultry processing lines also require that the equipment used be flexible and able to accommodate different transfer and conveyance systems between operations. The ability to provide for continuous processing is also advantageous, but must be balanced with the need to provide consistent products.

Traditional "front half" poultry processing involves loading the front half, which is the poultry portion including the ribcage, tenders, breasts and wings, onto some sort of conveyance device. An example is a vertical cone-shaped apparatus, onto which each front half is manually loaded by its chest cavity in an upward vertical position for further processing involving manually cutting the wings and/or breast portion from the front half. Another example, such as described in U.S. Pat. No. 4,648,144, conveys the poultry front half in a horizontal position to cut and remove the wing and breast portions from the front half.

While such front half processing has been used for many years, there remains a need for improving the manual loading process, reducing variability in cutting the front half shoulder section or joint, and providing for efficient continuous motion in front half poultry processing. In particular, a need exists to accommodate for the variability in poultry front half sizes and dimensions while reducing product loss associated with multiple transfer operations.

SUMMARY OF THE INVENTION

The present invention includes a poultry front half deboning system, comprising a horizontal loading module including a rotatable wing bracket, a shoulder cutting element, a wishbone cutting and removal system, a wing bracket rotator, and a counter-directional transfer line positioned above the wing bracket rotator, the transfer line comprising end effectors to securely attach to a pair of wings on the poultry front half after the wings have been rotated into a lifting position by the wing bracket rotator.

The invention also includes method for deboning a poultry front half, comprising the steps of providing a poultry front half having wings, breasts, tenders and a ribcage, loading the poultry front half onto a horizontal loading module comprising a rotatable wing bracket, securing the wings onto the rotatable wing bracket, conveying the horizontal loading module in a first direction, creating a shoulder cut under each breast of the poultry front half while the front half remains in a horizontal position and is conveyed in the first direction, optionally cutting and removing a wishbone from the poultry front half while the front half remains in the horizontal position and is conveyed in the first direction; moving the wings into a lifting position by rotating the wing bracket while the front half remains in the horizontal position and is conveyed in the first direction, and lifting and removing the wings and breasts from the ribcage by attaching the wings in the lifted position into an end effector of a counter-directional transfer line gantry moving in a second direction opposite to the first direction, while the ribcage and tenders remain on the horizontal loading module.

Another aspect of the invention includes a poultry front half module, comprising a body and a wing bracket, wherein the wing bracket is rotatably mounted to the body.

DETAILED DESCRIPTION OF THE INVENTION

The present invention is directed to a front half module and processing system that allows for efficiently loading the poultry front half onto the module, optionally removing the skin of the poultry, making one or more shoulder cuts in the front half, and removing the breasts and wings from the front half without the need for additional transfer operations, resulting in greater consistency, efficiency and speed than traditional methods.

Front Half Module

Figure 1A:
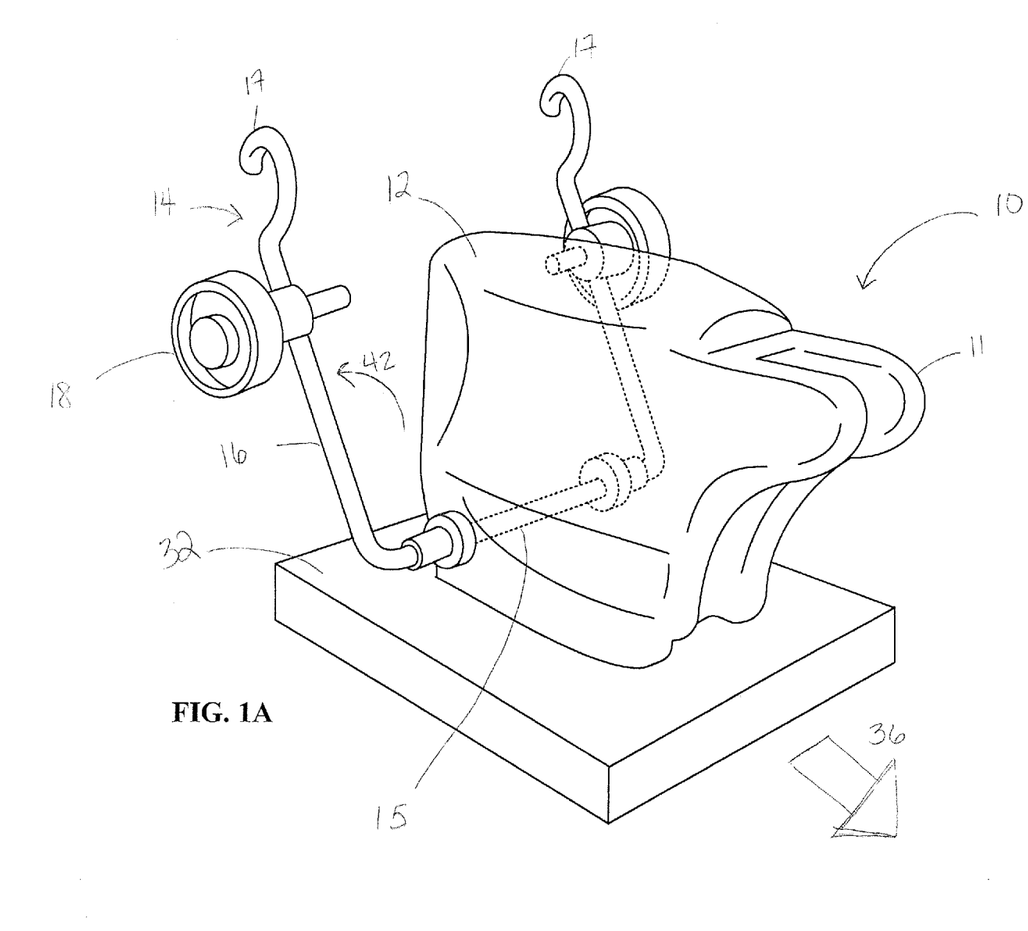
FIG. 1A is a perspective view of a poultry front half module with a wing bracket in a raised position.
Figure 1B:
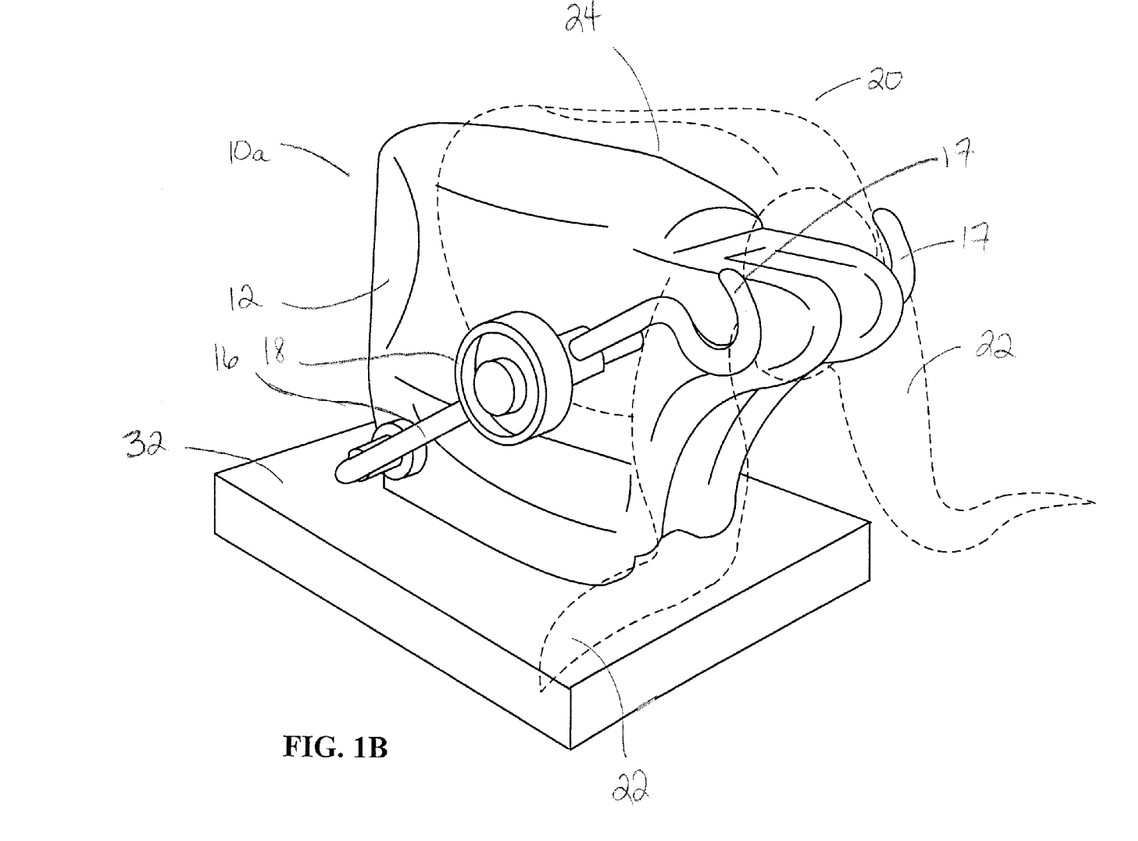
FIG. 1B is a perspective view of the poultry front half module with the wing bracket in a lowered position, with a poultry front half, shown in dashed lines, loaded onto the module.
Figure 1C:
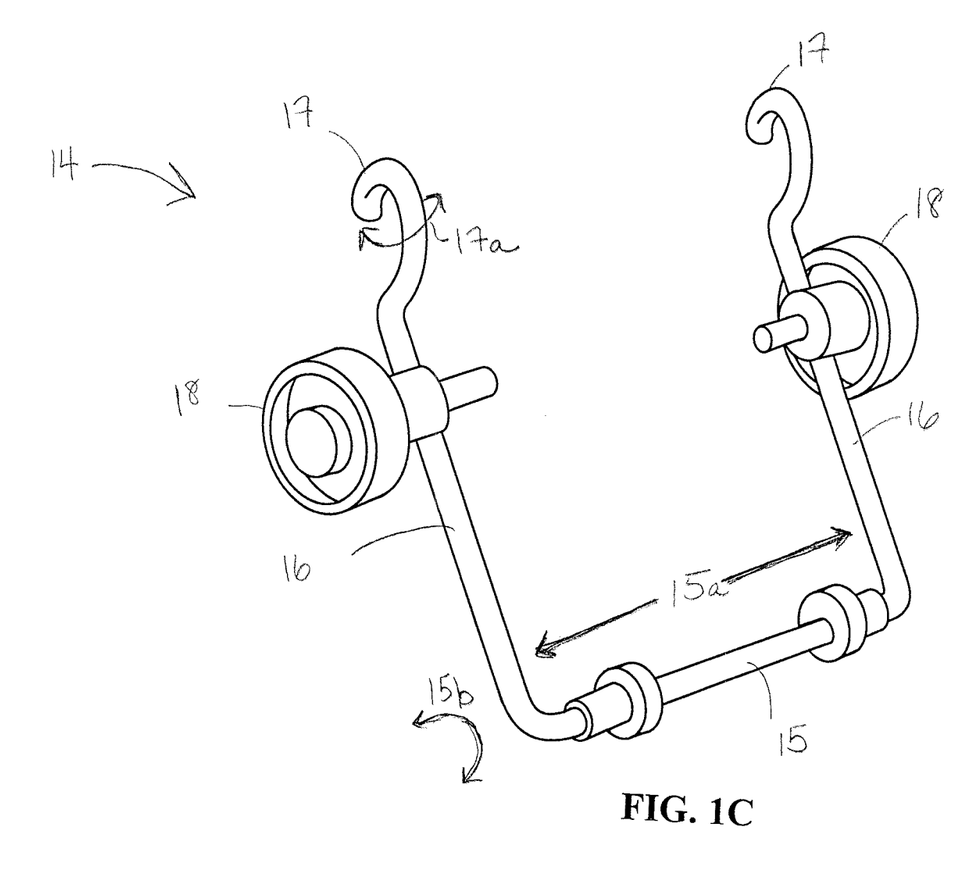
FIG. 1C is a perspective view of the wing bracket.
Figure 1D:
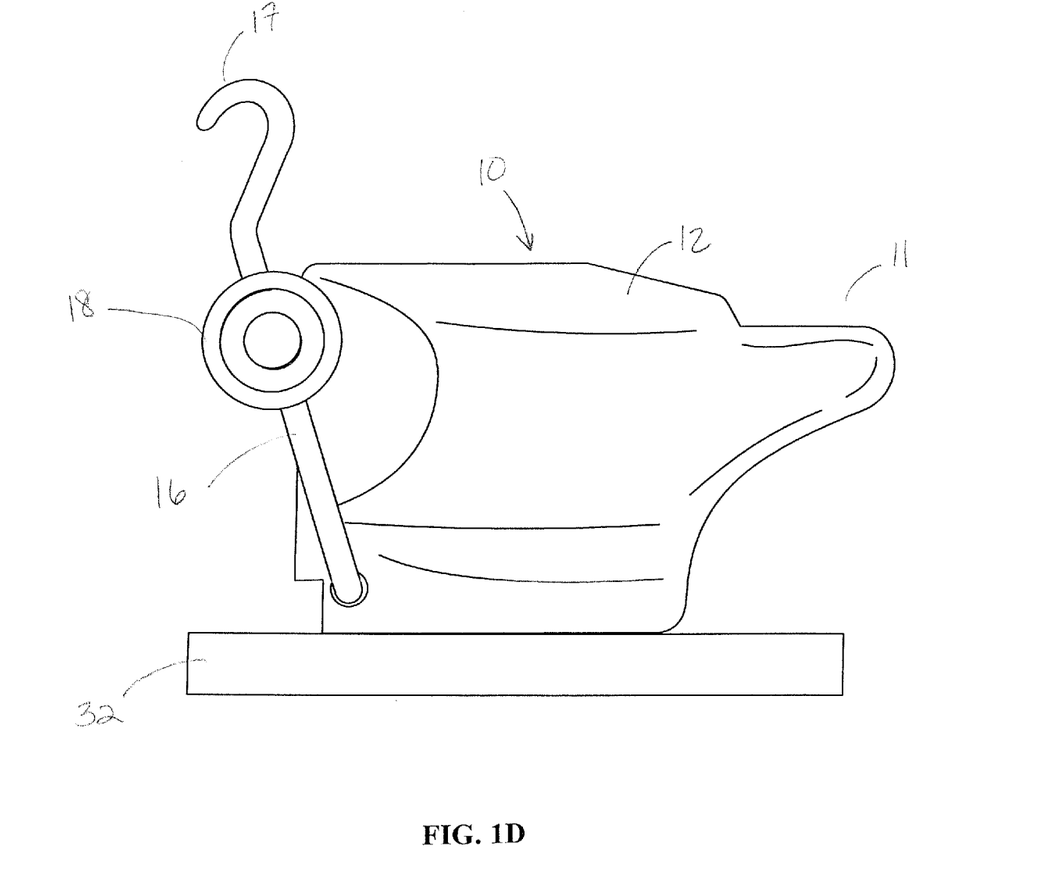
FIG. 1D is a side view of the poultry front half module with the wing bracket in a raised position.
Figure 1E:
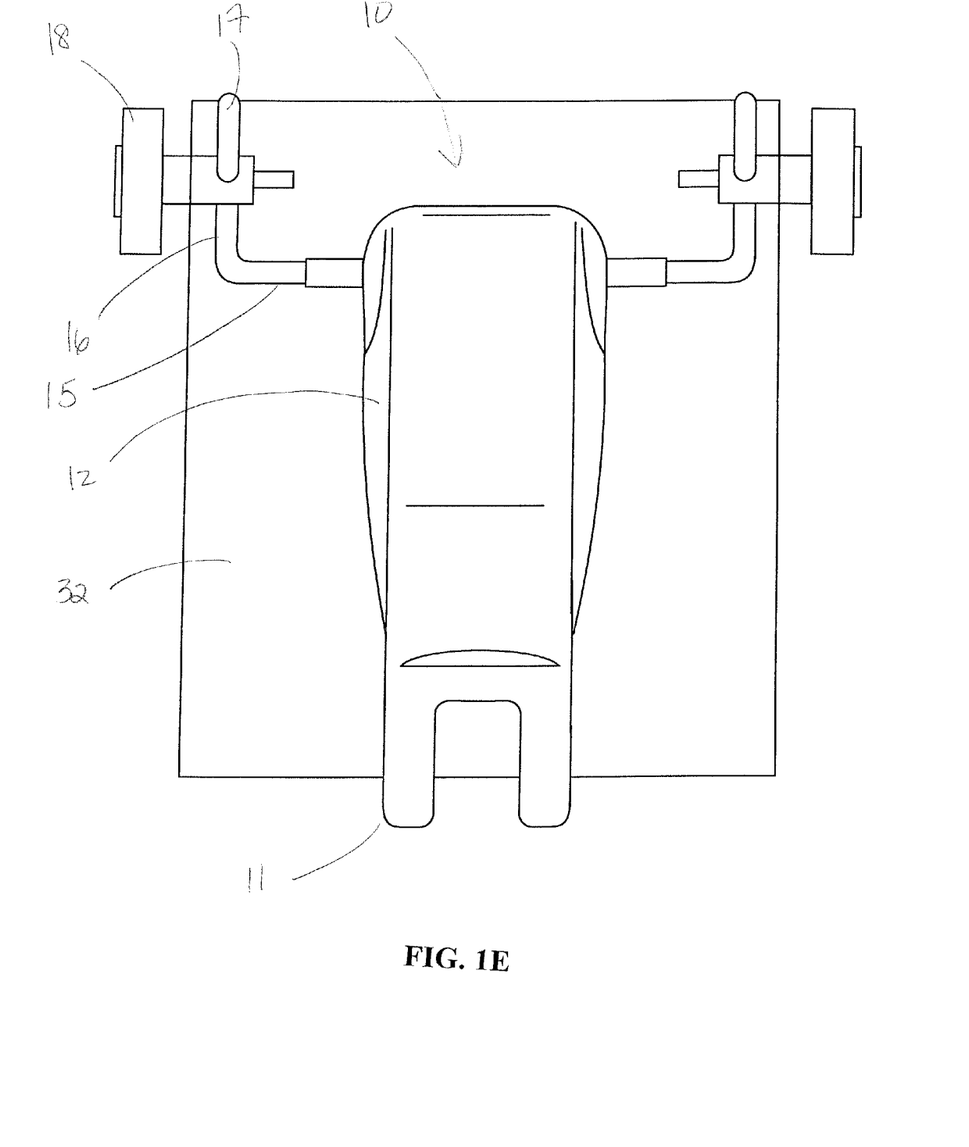
FIG. 1E is a top view of the poultry front half module with the wing bracket in a raised position.

Referring to FIGS. 1A, 1D and 1E, the front half module includes a horizontal loading module 10 onto which the poultry front half 20 (seen in FIG. 1B) can be loaded manually or automatically, starting from loading end 11 of the module onto which the chest cavity of the poultry front half is loaded, breast-side up. Horizontal loading module 10 includes body 12 and rotatable wing bracket 14 attached at the end of body 12 opposite to loading end 11. Body 12 may be of any shape suitable for carrying a poultry front half, such as generally rectangular, saddle-like, conical or cylindrical, or may be contoured to generally resemble the interior cavity of a poultry front half. Wing bracket 14 includes central element 15 connecting a pair of arms 16, which terminate distally from central element 15 at hooks 17. Hooks 17 are positioned such that poultry wings 22 as seen in FIG. 1B can be securely attached to the wing bracket 14 by hooks 17 when the poultry front half 20 is loaded onto body 12. Wing bracket 14 can be formed as a single element comprising hooks 17, or one or more of arms 16 and hooks 17 may be removably or fixedly attached to wing bracket 14 using any conventional fastening system such as bolts, soldering, and the like.

Body 12 and wing bracket 14 can be made of any material suitable for use on a poultry processing line, including but not limited to stainless steel, food-grade polymers, and the like. In one embodiment, body 12 may be made of a polymer material such as high density polyethylene, and wing bracket 14 may be made of a stainless steel material. In another embodiment, body 12 and wing bracket 14 are made of the same material.

Wing bracket 14 is rotatable in a direction 42 upward from first line direction 36, indicated by the arrow seen in FIG. 1A, and can be rotated back down to the position shown in FIG. 1B. The rotation of wing bracket 14 may be effected by the use of actuators 18 positioned on the outer side of hooks 17, or anywhere along the outer surface length of arms 16. Actuators 18 may be engaged by inclined planes on the processing line, described in more detail below. Other methods for rotating wing bracket 14 include the use of a spring- or piston-driven mechanism. In one embodiment, actuators 18 include a rotational component, such as a wheel. Alternatively, the rotation of wing bracket 14 may be controlled electronically to rotate arms 16 into an upward position based on the time and/or position of module 10 on the poultry processing line.

Central element 15 may have an adjustable length 15a, as seen in FIG. 1C, to accommodate different poultry front half sizes by increasing the distance between arms 16. The distance between arms 16 may be adjusted by equipping central element 15 with springs, a piston, or any other adjustable mechanism. Arms 16 may be directionally pivotable around the axis of central element 15, and can be raised and lowered as shown by directional arrow 15b. One or both hooks 17 may be rotatable around the axis of arms 16, as shown by directional arrow 17a. Additional bushings, washers, stoppers and the like may be used in conjunction with wing bracket 14 to ensure a secure rotatable fit within body 12. A sensor, such as an infrared light sensor, may be coupled with downstream operations to detect the position of arms 16 to adjust the spacing of downstream operations, such as the cutting operation described in more detail herein.

By using module 10 with wing bracket 14, the wings 22 are secured in a fixed position, as shown in FIG. 1B, prior to cutting operation 60. Because wings 22 are not simply hanging or dangling from the sides of poultry front half 20, or loosely engaged in a guide rail system, more precise shoulder joint cuts can be made to reduce cutting into the breast meat or bone. In addition, hooks 17 may be manipulated, such as by rotation of the hooks 17 on arms 16, to facilitate positioning of the wings 22 as they approach cutting operation 60.

Poultry Processing Line

Figure 1F:
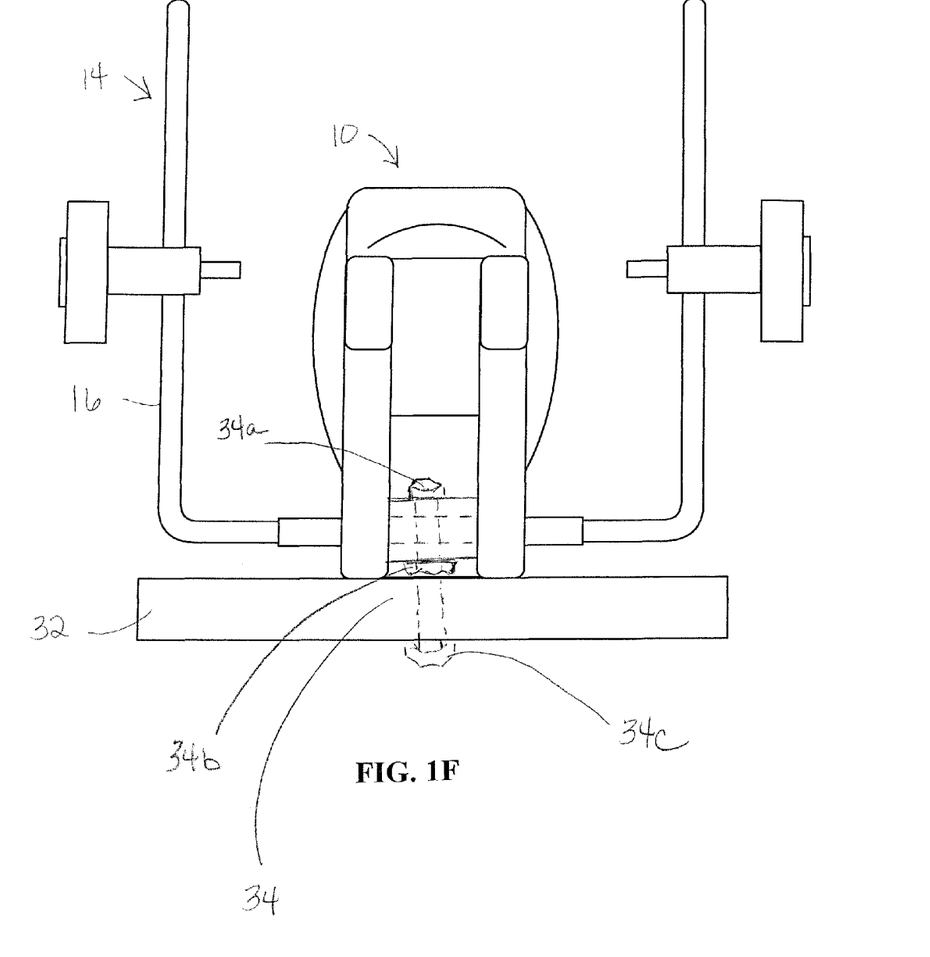
FIG. 1F is a rear view of the poultry front half module with the wing bracket in a raised position.
Figure 2A:
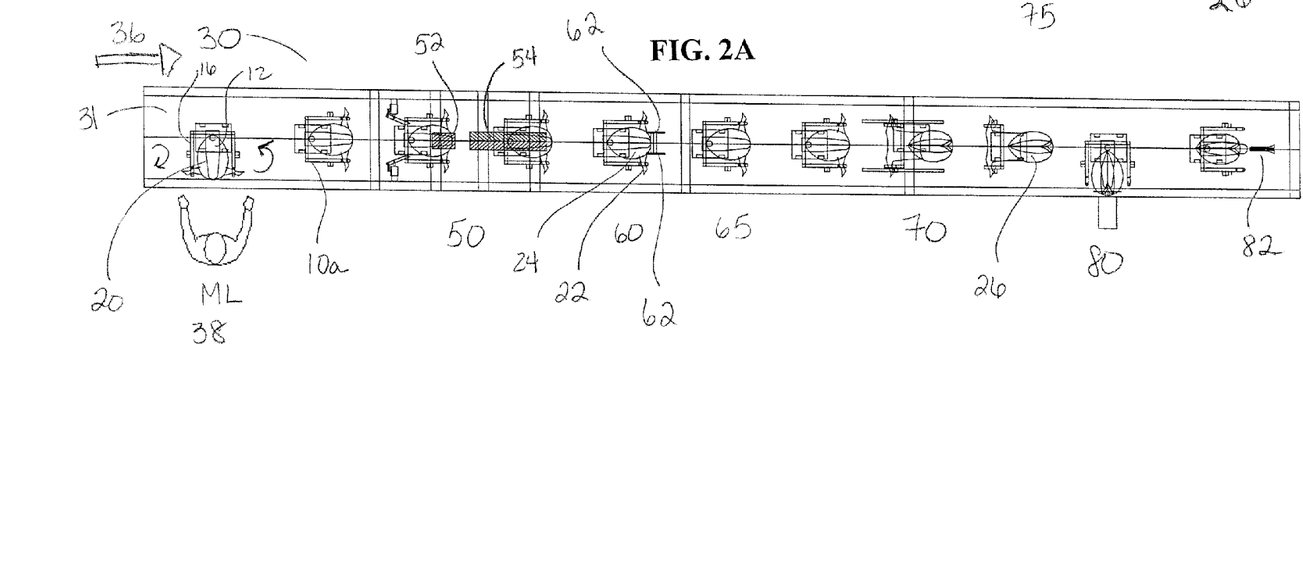
FIG. 2A is a top view of a front half processing line.
Figure 2B:
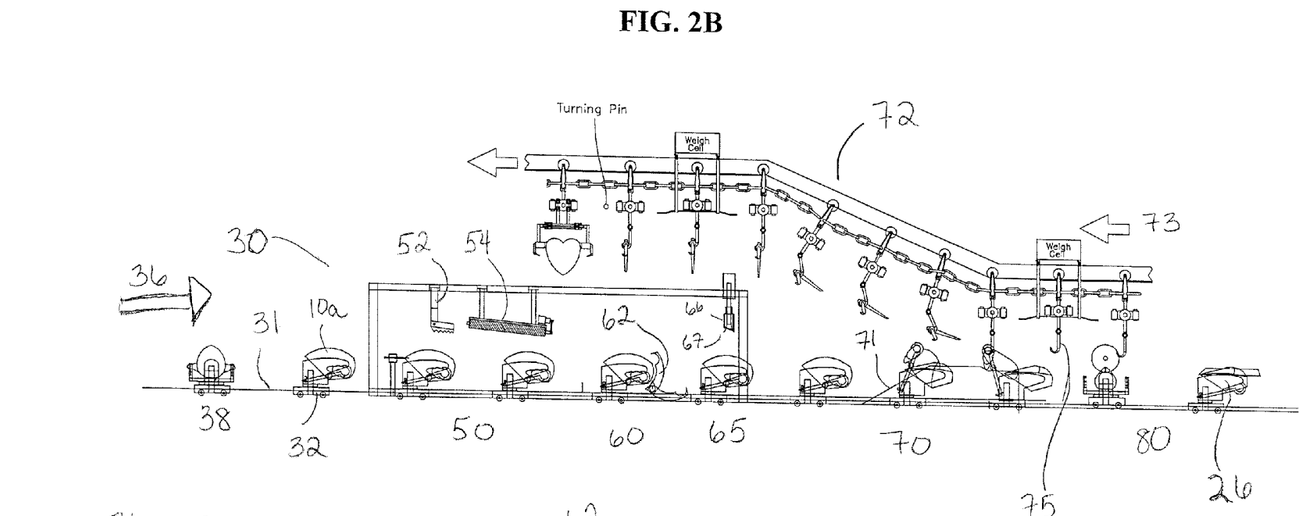
FIG. 2B is a side view of the front half processing line.

Horizontal loading module 10 may be mounted on poultry processing line 30, seen in FIGS. 2A (top view) and 2B (side view). Processing line 30 can be any kind of chain or belt type of continuous closed loop conveyor system 31 suitable for use in poultry processing, such as those available from Baader North America Corporation, Auburn, Wash. Module 10 is mounted onto any sort of base plate 32 connected to the conveyor belt or chain 31. Module 10 is preferably mounted onto base plate 32, as seen in FIG. 1F, using rotatable mechanism 34, such as a nut and bolt system. Bolt 34a is positioned in the center of body 12, extends through body 12, and is secured to base plate 32 by nut 34b on the upper surface of plate 32 and nut 34c positioned below base plate 32. Rotatable mechanism 34 permits module 10 to be rotated away from the line direction 36 and then rotated back into the line direction 36, as seen by the arrows in FIG. 2A. The degree of rotation of rotatable mechanism 34 can vary, but is preferably between about 0 to about 90 degrees away from line direction 36. In one embodiment, rotatable mechanism 34 first rotates in a clockwise direction to turn the module 10 and arms 16 towards a manual loader ML, then rotates counterclockwise to turn the module 10, with the poultry front half loaded thereupon, back to the first line direction 36.

Loading Operation

Referring to FIGS. 2A and 2B, in operation, as each module 10 is conveyed to loading station 38, module 10 rotates away from line direction 36 so that the manual loader ML can slide the poultry front half 20 horizontally and breast-side up onto body 12, and can securely hook the wings 22 into the hooks 17 of wing bracket 14 as shown in FIG. 1B, before module 10 rotates back into the line processing direction 36. In one embodiment, the rotation of module 10 is controlled by the manual loader. In other embodiments, the rotation of module 10 may be controlled mechanically and/or electronically.

By using module 10 with wing bracket 14, the wings 22 are secured in a fixed position prior to cutting operation 60. Because wings 22 are not simply hanging or dangling from the sides of poultry front half 20, more precise shoulder joint cuts can be made to reduce cutting into the breast meat or bone. As a result, more breast meat will be available during the deboning process, resulting in less waste and greater production yields.

Module 10 which has been loaded with poultry front half 20 will hereinafter be referred to as "loaded module 10a".

In one embodiment, the loaded module 10a proceeds onto a skin scoring and removal area 50. A skin scorer 52 may be positioned above and then lowered to contact the poultry front half on module 10 to break up the surface of the poultry skin, after which the loded module 10a goes through peeler rollers 54, followed by a vacuum or other removal system to remove and further handle the poultry skin. Alternatively, the skin on poultry front end 20 may be left on or removed after the breast and wing portions have been removed from the poultry front end.

Cutting Operation

Again referring to FIGS. 2A and 2B, loaded module 10a then proceeds in the line direction 36 to a cutting operation 60 to cut the shoulder joint connecting the wing to the poultry front half. The shoulder cut is designed to cut the joint, but not all of the surrounding meat and connective tissue, so that the wing 22 remains attached to the breast portion 24. Cutting operation 60 may be performed manually or by a pair or plurality of cutting blades 62 positioned on both sides of processing line 30. As best seen in FIG. 2B, the cutting blades 62 may first be in a lowered position on processing line 30, and can then be lifted into the cutting position by any sort of actuation or engagement mechanism triggered by the advancement of loaded module 10a along processing line 30. Cutting blades 62 make a cut along the shoulder joint to facilitate release of the breast portion in a subsequent processing step. The blades 62 are preferably sized and positioned so that the wing is not completely severed from the front half, but remains attached thereto.

A sensor may be coupled with cutting operation 60 to detect the position of arms 16 to adjust the spacing between blades 62. By adjusting the distance between blades 62, the shoulder cuts can be more accurately made on poultry front half 20 to reduce waste and increase consistency of the operation.

In a manual cutting operation, in one embodiment loaded module 10a may be rotated, for example, 90 degrees from the line direction in a manner similar to the loading operation, towards a manual operator for making the shoulder cuts. After the cuts are made, loaded module 10a may be rotated back into line direction 36 to proceed towards the next operation.

Wishbone Removal Operation

Once the shoulder cuts have been made in poultry front half 20, loaded module 10a proceeds to a wishbone removal operation 65, which can be any type of wishbone cutting and removal system. One example of such a system includes a cutting blade 66 into which a spring steel lifting mechanism 67 is embedded, such that the blade 66 and lifting mechanism 67 together come into contact with poultry front half 20 to make a cut of sufficient size and depth to remove the wishbone. After cutting, blade 66 is retracted first, allowing lifting mechanism 67 to remain in contact with the wishbone. Upon retracting mechanism 67, the wishbone is lifted and removed from poultry front half 20 for further handling. Alternatively, the wishbone may be cut and removed manually.

Breast Deboning/Removal Operation

Figure 3A:
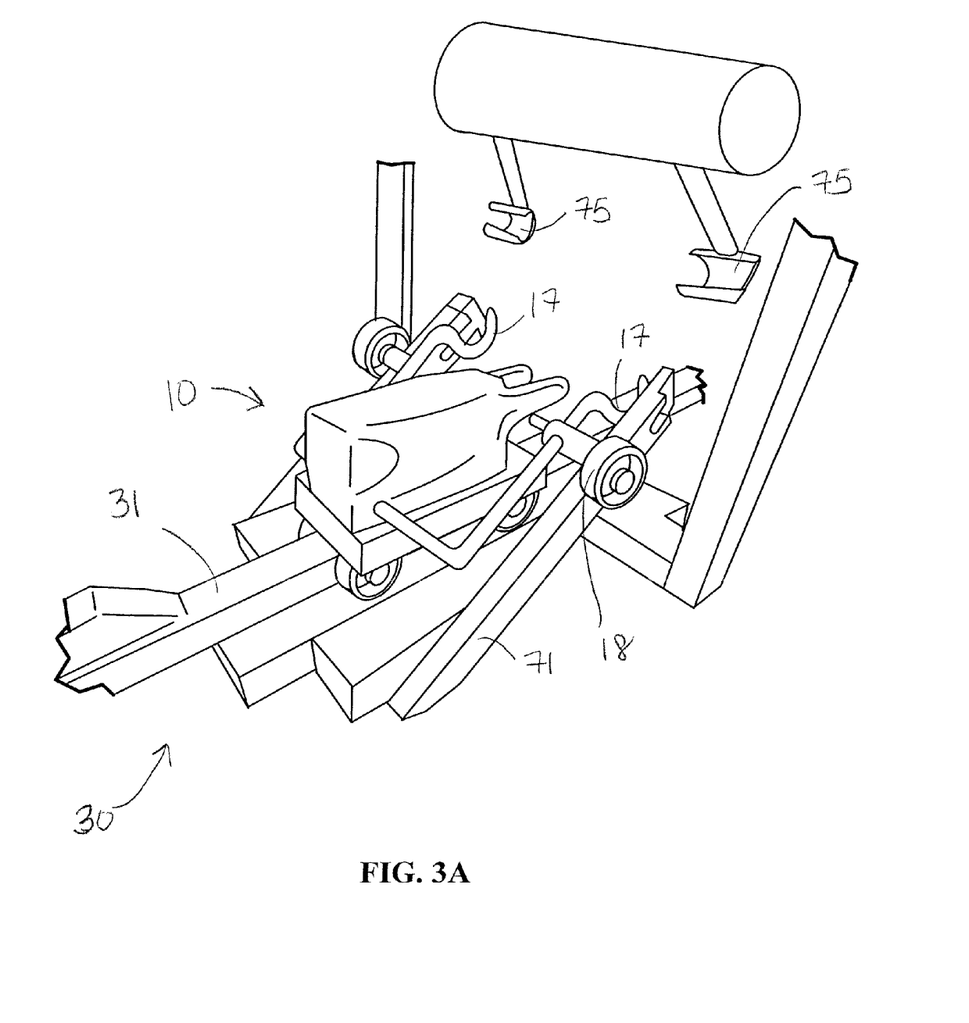
FIG. 3A is a perspective view of the breast removal operation.
Figure 3B:
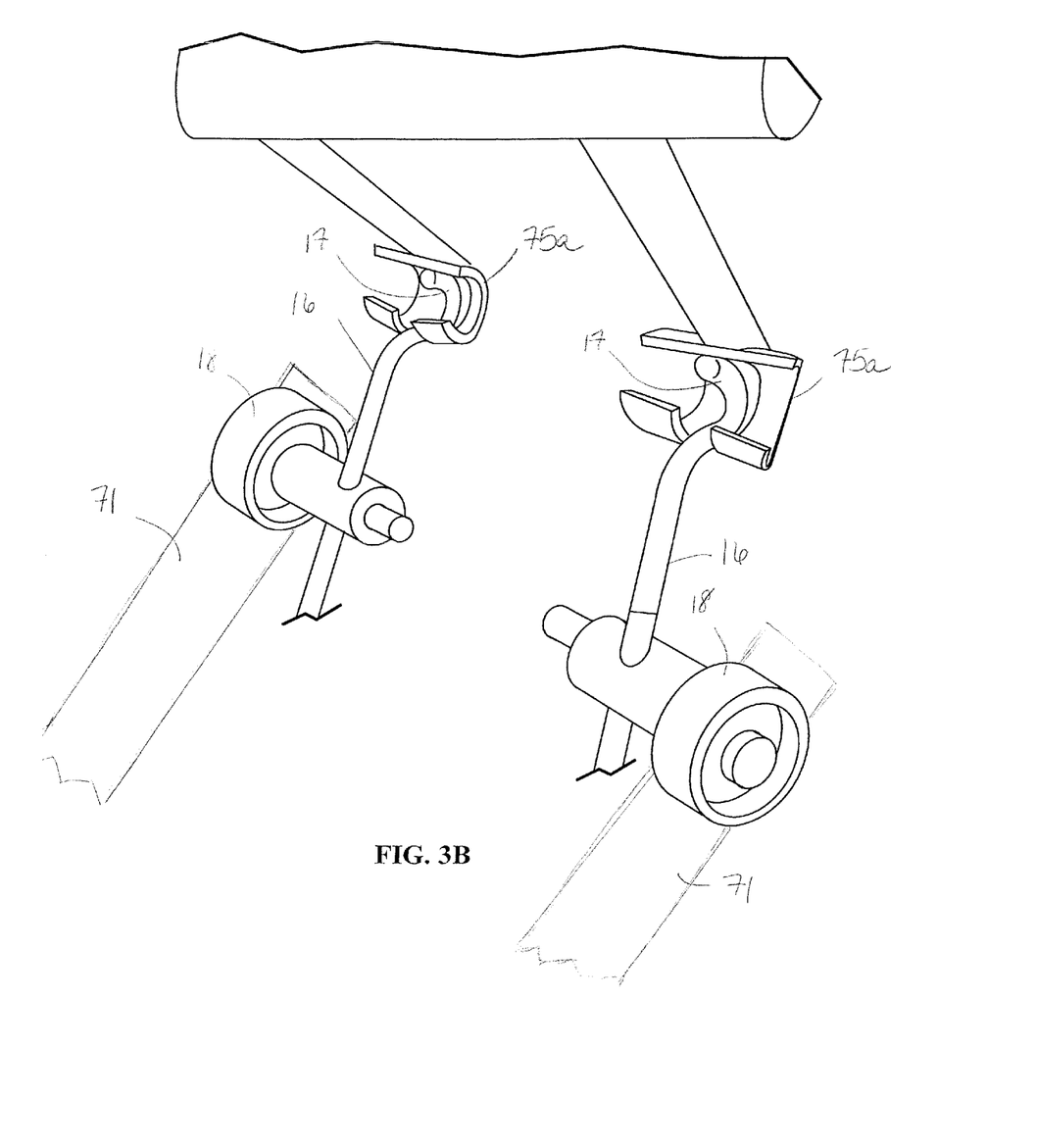
FIG. 3B shows a close-up perspective view of the breast removal operation.
Figure 3C:
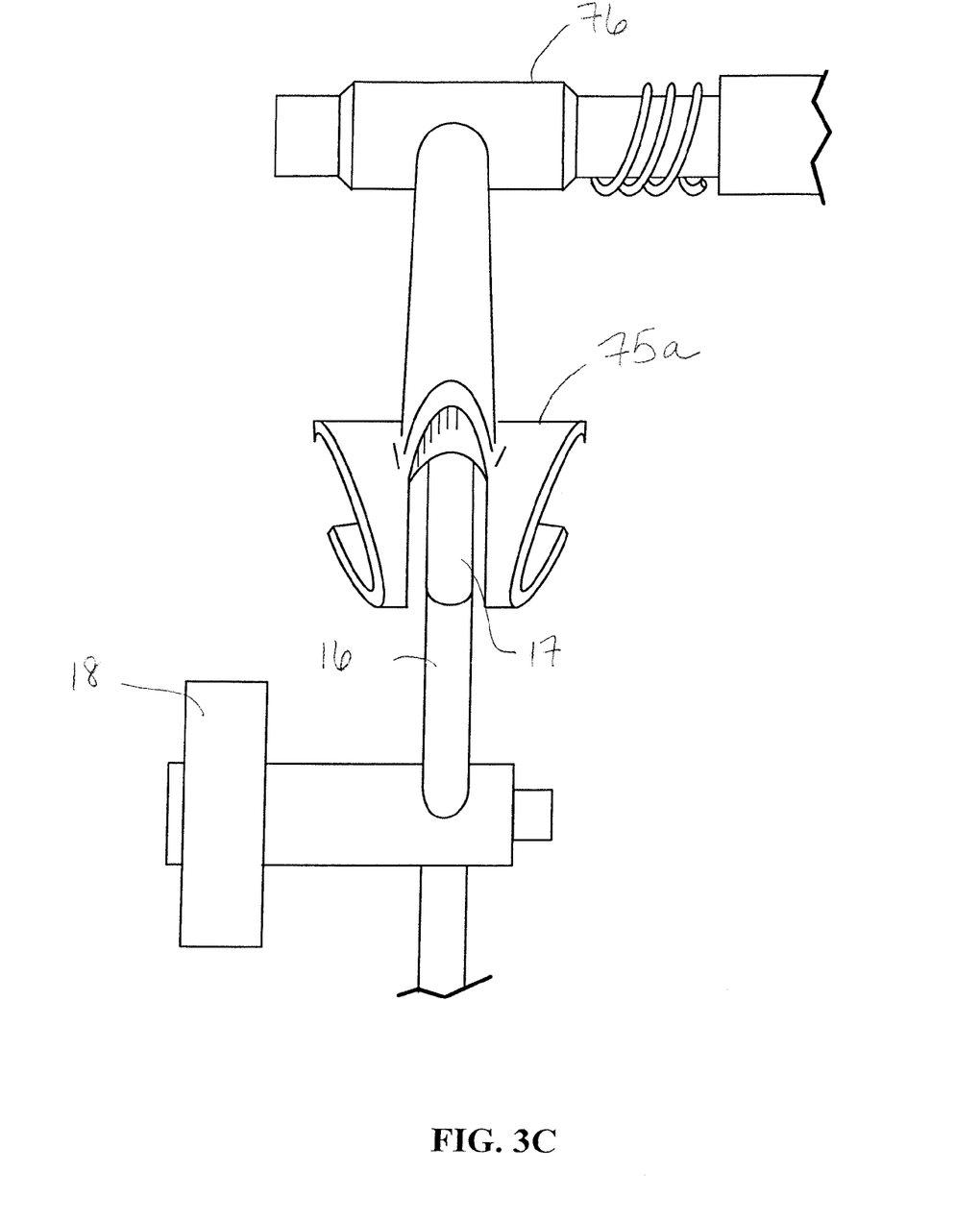
FIG. 3C is a rear view of the breast removal operation.

After the wishbone has been removed, loaded module 10a progresses towards a breast removal operation 70, seen in FIG. 2B and in greater detail in FIGS. 3A, 3B and 3C, shown without the poultry front half 20 for purposes of clarity. Breast removal operation includes an inclined plane 71 along processing line 30, to actuate actuators 18 to raise rotating arms 16, thereby lifting each poultry wing 22 upwardly from loaded module 10a. Inclined plane 71 may be position in any angle relative to processing line 30, such as between about 10 degrees and 80 degrees, or between 20 degrees and 50 degrees, or approximately 35 to 65 degrees. Other methods of rotating arms 16 are contemplated, such as other mechanical, electronic or other rotational systems.

Breast removal operation includes a secondary overhead conveyor line 72, which can be positioned on an overhead trolley (not shown) for maneuverability. Overhead line 72 operates in a second line direction 73 approximately opposite of line direction 36. Overhead line 72 includes a pair or plurality of end effectors 75. End effectors 75 are positioned downwardly on line 72 to be able to engage the lifted wings 22 on the loaded module 10a positioned below overhead line 72. Overhead line 72 includes an incline at any angle complementary to the incline of inclined plane 71 of processing line 30 so that the end effectors can contact and engage lifted wings 22 on rotating arms 16. Once lifted wings 22 are engaged by the overhead end effectors 75, the simple motion of secondary overhead line 72 in line direction 73 operates to apply sufficient force to peel, remove and transfer the wings 22 and breast portion 24 away from poultry front half 20 in a single step. By using the opposite motion of line 72 to perform the breast removal operation, the breast meat comes off of the poultry keel bone and ribcage cleanly along the natural tear lines of the poultry front half, rather than having to be cut or sheared off. In effect, the opposite motion of line 72 serves to mimic hand-preparation of poultry by a chef or butcher.

Overhead line 72 combines the steps of deboning and transferring the wing and breast portions for further processing into a single step, saving time and improving efficiency of the entire operation.

End effectors 75 may include a slotted effector 75a, to be able to engage in a sliding relationship with wing bracket hooks 17, seen in FIGS. 3B and 3C (rear view). End effectors may be connected by adjustable arm 76, seen in FIG. 3C, to adjust the spacing between end effectors 75 to facilitate various processing steps. For example, for engaging lifted wings 22, end effectors 75 may be positioned closer together depending on the size of poultry front half 20. For separating the breast portion 24 from the wings 22 after they have been removed from the front half, the end effectors 75 may be moved further apart to align the wing joints with the wing joint cutting blades. The length of adjustable arm 76 may be adjusted by springs, an actuating piston, or any other mechanism for changing the spacing between end effectors 75. End effectors 75 may be mechanically maneuverable between open and closed positions, such as by a piston or spring, to completely or substantially completely encircle the wing 22 around its circumference. Overhead line 72 may include one or more weigh cells to weigh the breast and wing portion once it has been removed from the front half, and may include one or more turning pins as needed to facilitate the conveyance of the wing and breast portion to subsequent operations.

Downstream Processing

Once the wings 22 and breast portion 24 have been removed, the remainder of poultry front half 20 continues along line direction 36 for cutting and removal of the tenders and further processing. The tenders 26 may be removed by a manual or automatic tender cutting operation 80 shown in FIG. 2A, and the tenders can be picked or plowed off for further handling, such as with a plow 82. Module 10 allows the tendons to be cut while still on the rib cage before the tenders are removed, providing greater ease and accuracy in the process. Once the tenders 26 have been removed, any additional processing steps may take place, with the final steps being removal of any remaining front half portion from the horizontal loading module, cleaning of the module, and conveying the module 10 back to the loading station 38 by the continuous loop conveyor belt or chain 31.

Figure 4A:
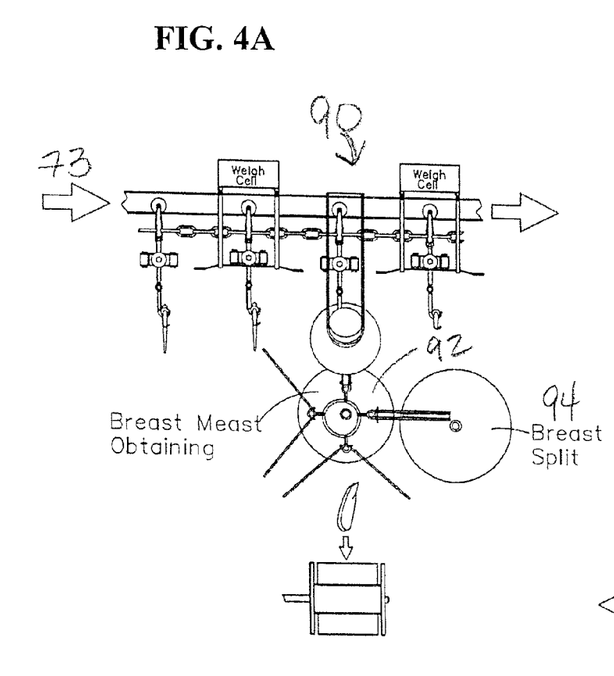
FIG. 4A is a side view of the breast meat obtaining operation.
Figure 4B:
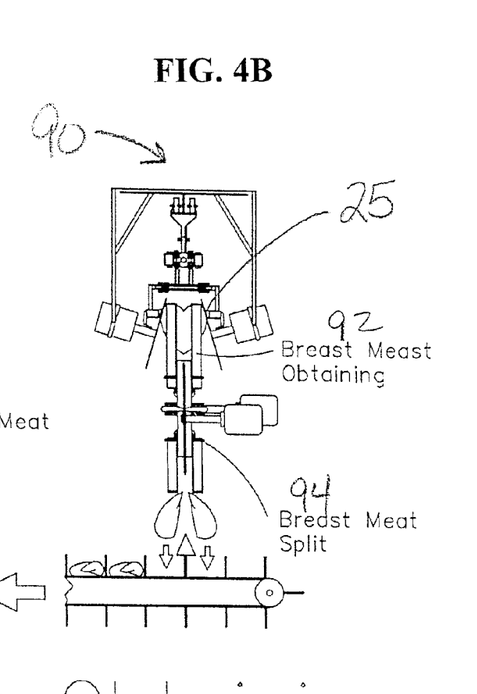
FIG. 4B is an end view of the breast meat obtaining operation.

Wings 22 and breast portion 24, now engaged by end effectors 75 on secondary line 72, can be weighed, inspected, and further processed as desired. For example, in breast obtaining operation 90 shown in FIGS. 4A (side view) and 4B (end view), the breast portion 24 may be obtained by cutting the wing joint 25 using a pair or plurality of cutting blades 92, leaving wings 22 attached to end effectors 75. In this cutting operation, in one embodiment end effectors 75 may be moved further apart from each other to facilitate cutting of the joint. A sensor may be positioned to detect the distance between the end effectors 75 to adjust the distance between cutting blades 92 accordingly. The obtained breast portion 24 then may be split by splitter 94 and portioned for further processing.

Figures 5A, 5B:
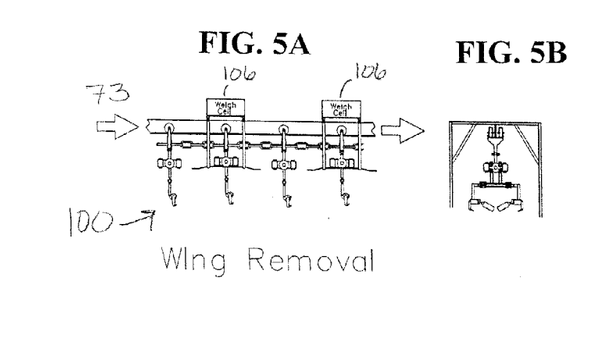
FIG. 5A is a side view of the wing segmenting operation.
FIGS. 5B-E show an end view of the wing segmenting operation.
Figures 5C, 5D:
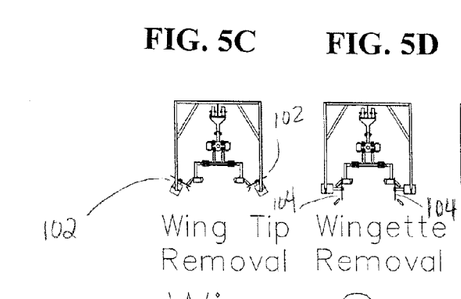
Figure 5E:
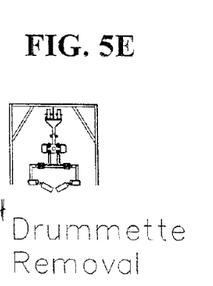

Wings 22 continue on to a wing segmenting operation 100 shown in FIGS. 5A (side view) 5B (end view), and 5C-E, which may include wing tip removal as in FIG. 5C, wingette removal as in FIG. 5D, and drummette removal as in FIG. 5E, utilizing appropriately sized cutting blades 102 and 104, and optional weigh cells 106, at each step of the wing segmenting operation.

The apparatus of the present invention provides for greater consistency in making the shoulder cuts because the wings are in a fixed position relative to the breasts, i.e., the front half is not suspended in the air as in a vertical hanging operation, nor are they hanging loosely to the sides as in a vertical cone or guide rail operation. With the wings in a fixed position, as the shoulder cutting blade is approached, the cuts are made more consistently and straighter than in other systems, leading to better and more consistent wing and breast portion formation. Utilizing the counter-directional transfer line itself to remove the wing and breast portions from the ribcage eliminates the step of having to first remove the wing and breast portions from the ribcage before they are transferred to additional processing operations, which significantly increases the overall efficiency of the process.

Although the foregoing description has described and enabled various embodiments of the invention, it is not intended to limit the full scope of the invention, which is defined by the following claims.

The invention claimed is:

1. A poultry front half deboning apparatus, comprising:
a horizontal loading module including a wing bracket;
a shoulder cutting element;
a wishbone cutting and removal system;
a wing bracket rotator; and
a counter-directional transfer line positioned above the wing bracket rotator, the transfer line comprising end effectors to securely attach to a pair of wings on the poultry front half after the wings have been rotated into a lifting position by the wing bracket rotator.

2. The apparatus of claim 1, wherein the counter-directional transfer line is capable of removing the wings and a breast meat portion from the poultry front half while the poultry front half remains on the horizontally positioned loading module.

3. The apparatus of claim 1, wherein the horizontal loading module is rotatable around a vertical axis.

4. The apparatus of claim 3, wherein the loading module is capable of rotating about 90 degrees away from a machine direction.

5. The apparatus of claim 1, further comprising a skin removal system.

6. The apparatus of claim 1, further comprising a tendon cutting and tender removal system capable of operating while the front half remains on the horizontally positioned loading module.

7. The apparatus of claim 1, wherein the wing bracket comprises a central element and a plurality of arms, said arms being directionally pivotable around an axis of the central element.

8. The apparatus of claim 7, wherein the arms terminate in a plurality of hooks, said hooks being rotatable around an axis of the arms.

9. The apparatus of claim 1, wherein wing bracket comprises a plurality of arms terminating in a plurality of hooks, said hooks being rotatable around an axis of the arms.

10. A method for deboning a poultry front half, comprising the steps of:
a. providing a poultry front half having wings, breasts, tenders and a ribcage;
b. loading the poultry front half onto a horizontal loading module comprising a wing bracket;
c. securing the wings onto the rotatable wing bracket;
d. conveying the horizontal loading module in a first direction;
e. creating a shoulder cut under each breast of the poultry front half while the front half remains in a horizontal position and is conveyed in the first direction;
f. cutting and removing a wishbone from the poultry front half while the front half remains in the horizontal position and is conveyed in the first direction;
g. the wings into a lifting position by rotating the wing bracket while the front half remains in the horizontal position and is conveyed in the first direction;
h. lifting and removing the wings and breasts from the ribcage by attaching the wings in the lifted position into an end effector of a counter-directional transfer line gantry moving in a second direction opposite to the first direction, while the ribcage and tenders remain on the horizontal loading module.

11. The method of claim 10, further comprising the step of:
i. conveying the ribcage and tenders on the horizontal loading module to a tendon cutting and tender removal system to cut and remove the tenders from the ribcage.

12. The method of claim 11, wherein the horizontal loading module rotates about 90 degrees prior to being conveyed to the tendon cutting and tender removal system.

13. The method of claim 10, further comprising a skin removal system.

14. The method of claim 10, wherein after the wings are secured in the wing bracket, the horizontal loading module rotates around a vertical axis to be conveyed in the first direction.

15. The method of claim 14, wherein the horizontal loading module rotates about 90 degrees after the poultry front half is loaded onto the module.

16. The method of claim 10, wherein loading the poultry front half includes sliding a chest cavity of the front half breast-side up onto a loading end of the horizontal loading module and securing the wings in the wing bracket.

17. The method of claim 16, wherein securing the wings in the wing bracket includes pivoting the wing bracket to engage the wings.

18. The method of claim 17, wherein the wing bracket comprises a plurality of hooks, further comprising the step of rotating the hooks to securely engage the wings onto the wing bracket.

19. The method of claim 16, further comprising the step of adjusting the width of the wing bracket to secure the wings in the wing bracket.

20. A poultry front half module, comprising a body and a wing bracket, wherein the wing bracket is pivotably mounted to the body, said wing bracket comprising a hook for engaging a poultry wing on an end of the wing bracket, wherein the hook is capable of a sliding engagement with an overhead effector.

21. The module of claim 20, wherein the overhead effector comprises a slot through which the hook may be slidingly engaged.

22. The module of claim 20, comprising a plurality of hooks.

23. The module of claim 20, wherein the effector may be mechanically opened and closed.

24. The module of claim 20, comprising a plurality of effectors.

25. The module of claim 20, wherein the wing bracket comprises an actuator by which the wing bracket may be pivoted.

* * * * *

UNITED STATES PATENT AND TRADEMARK OFFICE
CERTIFICATE OF CORRECTION

PATENT NO.       : 8,961,273 B2                                  Page 1 of 1
APPLICATION NO.  : 14/205744
DATED            : February 24, 2015
INVENTOR(S)      : Douglas Robert Connell It is certified that error appears in the above-identified patent and that said Letters Patent is hereby corrected as shown below:

In the Claims

In column 8, line 4, before "the wings into" insert --moving--.

Signed and Sealed this
Twenty-third Day of June, 2015

Michelle K. Lee
*Director of the United States Patent and Trademark Office*